(12) United States Patent
Chang et al.

(10) Patent No.: US 11,921,767 B1
(45) Date of Patent: Mar. 5, 2024

(54) EFFICIENT ACCESS MARKING APPROACH FOR EFFICIENT RETRIEVAL OF DOCUMENT ACCESS DATA

(71) Applicant: PALANTIR TECHNOLOGIES INC., Palo Alto, CA (US)

(72) Inventors: Allen Chang, Sunnyvale, CA (US); Timothy Wilson, Palo Alto, CA (US); Robert Liu, Palo Alto, CA (US); Jeffrey Chen, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 125 days.

(21) Appl. No.: 16/258,451

(22) Filed: Jan. 25, 2019

Related U.S. Application Data

(60) Provisional application No. 62/731,100, filed on Sep. 14, 2018.

(51) Int. Cl.
*G06F 16/35* (2019.01)
*G06F 16/31* (2019.01)
(Continued)

(52) U.S. Cl.
CPC ............ *G06F 16/35* (2019.01); *G06F 16/319* (2019.01); *G06F 16/334* (2019.01); *G06F 16/93* (2019.01); *G06F 21/62* (2013.01)

(58) Field of Classification Search
CPC ........ G06F 16/35; G06F 16/334; G06F 16/93; G06F 16/319; G06F 21/62
See application file for complete search history.

(56) References Cited

U.S. PATENT DOCUMENTS 5,704,060 A * 12/1997 Del Monte ............. H03M 7/30
8,918,818 B2    12/2014 DeWeese et al.
(Continued)

FOREIGN PATENT DOCUMENTS

CN    101192237 A * 6/2008 ........... G06F 16/319
CN    103902697 A * 7/2014 ......... G06F 16/3322
(Continued)

OTHER PUBLICATIONS

Oleinikova, O.L., Shogin, A.N. "Reverse" indexing for an IRS with a special databank. Sci. Tech.Inf. Proc. 35, 139-142 (2008). https://doi.org/10.3103/S0147688208030052 (Year: 2008).*
(Continued)

*Primary Examiner* — Neveen Abel Jalil
*Assistant Examiner* — Hubert Cheung
(74) *Attorney, Agent, or Firm* — Duane Morris LLP

(57) ABSTRACT

A computer-implemented method comprises creating and storing a plurality of different access group identifiers each associated with one or more user account identifiers, and a plurality of different classification markings each representing a different access restriction for an electronic document, and associating each of the user account identifiers with one or more of the classification markings; indexing each particular electronic document among a plurality of different electronic documents in association with values of one or more of the access group identifiers and with an inverse list of values of the classification markings that apply to the particular electronic document in a classification index; receiving a search query that specifies one or more attributes of electronic documents; obtaining one or more first classification markings, among the plurality of classification markings, which are associated with a particular user account identifier that is associated with the search query; executing a search of the classification index based on the
(Continued)

search query using a covering query that requires a specified minimum number of matches between the one or more first classification markings and one or more second classification markings that are associated with a particular electronic document, and adding the particular electronic document to a result set of the search only when the covering query is satisfied; providing the result set in response to the search query.

12 Claims, 5 Drawing Sheets

(51) Int. Cl.
*G06F 16/33* (2019.01)
*G06F 16/93* (2019.01)
*G06F 21/62* (2013.01)

(56) References Cited

U.S. PATENT DOCUMENTS

| | | | |
|---|---|---|---|
| 9,177,171 B2* | 11/2015 | Roitman | G06F 21/6227 |
| 9,183,203 B1* | 11/2015 | Tuchman | G06F 16/3347 |
| 9,531,719 B1* | 12/2016 | Sutton | H04L 63/10 |
| 9,674,202 B1* | 6/2017 | Margel | H04L 63/0281 |
| 9,712,466 B2 | 7/2017 | Cohen et al. | |
| 9,992,022 B1* | 6/2018 | Chapman | G06F 21/604 |
| 10,250,401 B1 | 4/2019 | Skiff et al. | |
| 2006/0143171 A1* | 6/2006 | Doerre | G06F 16/316 |
| | | | 707/999.005 |
| 2007/0174399 A1 | 7/2007 | Ogle et al. | |
| 2008/0195597 A1* | 8/2008 | Rosenfeld | G06F 16/40 |
| | | | 707/999.005 |
| 2009/0049524 A1* | 2/2009 | Farrell | H04L 63/105 |
| | | | 726/4 |
| 2010/0262577 A1* | 10/2010 | Pulfer | G06F 21/6209 |
| | | | 707/E17.008 |
| 2011/0093458 A1* | 4/2011 | Zheng | G06F 16/2246 |
| | | | 707/E17.109 |
| 2011/0276903 A1 | 11/2011 | Mehin et al. | |
| 2011/0276920 A1* | 11/2011 | Fong | G06F 16/2423 |
| | | | 715/810 |
| 2013/0097688 A1 | 4/2013 | Bradley, II et al. | |
| 2013/0185332 A1* | 7/2013 | Koide | G06F 21/6236 |
| | | | 707/783 |
| 2013/0238631 A1* | 9/2013 | Carmel | G06F 16/288 |
| | | | 707/742 |
| 2014/0244794 A1* | 8/2014 | Nakadai | H04L 67/104 |
| | | | 709/217 |
| 2015/0278266 A1* | 10/2015 | Tang | G06F 16/2228 |
| | | | 707/711 |
| 2015/0319111 A1 | 11/2015 | Carino et al. | |
| 2015/0331847 A1* | 11/2015 | Jung | G06F 16/3341 |
| | | | 707/739 |
| 2015/0350251 A1 | 12/2015 | Brander et al. | |
| 2015/0358306 A1 | 12/2015 | Adams et al. | |
| 2016/0337291 A1 | 11/2016 | Park et al. | |
| 2018/0048464 A1* | 2/2018 | Lim | H04L 9/0894 |
| 2018/0225471 A1* | 8/2018 | Goyal | G06F 21/6209 |
| 2018/0293304 A1* | 10/2018 | Miller | G06F 16/345 |
| 2019/0147182 A1* | 5/2019 | Arora | G06F 16/00 |
| | | | 726/28 |
| 2019/0392006 A1* | 12/2019 | Horowitz | G06F 16/178 |
| 2020/0097509 A1* | 3/2020 | Keskar | G06F 16/9535 |

FOREIGN PATENT DOCUMENTS

| | | | | | |
|---|---|---|---|---|---|
| CN | 104239395 A | * | 12/2014 | | G06F 16/319 |
| CN | 105378726 A | * | 3/2016 | | G06F 16/22 |
| CN | 107679121 A | * | 2/2018 | | G06F 16/3344 |
| CN | 106021562 B | * | 5/2019 | | G06F 16/951 |
| CN | 107908724 B | * | 9/2020 | | G06F 16/90335 |
| CN | 109062950 B | * | 11/2021 | | |
| DE | 10048478 A1 | * | 4/2002 | | G06F 16/90344 |
| EP | 0848314 A1 | * | 6/1998 | | |
| EP | 1677217 A2 | * | 7/2006 | | G06F 17/30619 |
| JP | 2003504732 A | * | 2/2003 | | |
| JP | 2007102786 A | * | 4/2007 | | G06F 16/367 |
| JP | 2014182573 A | * | 9/2014 | | |
| KR | 101828995 B1 | * | 2/2018 | | |
| WO | WO-2014047727 A1 | * | 4/2014 | | G06F 17/275 |

OTHER PUBLICATIONS

Official Communication for European Patent Application No. 18209228.8 dated Jan. 22, 2019.
European Patent Office, "Article 94(3) EPC" in application No. 19197223.1-1217, dated Mar. 3, 2021, 8 pages.
European Claims in application No. 19197223.1-1217, dated Mar. 2021, 2 pages.
U.S. Appl. No. 15/826,441, filed Nov. 29, 2017, First Office Action Interview, dated Feb. 27, 2019.

* cited by examiner

EFFICIENT ACCESS MARKING APPROACH FOR EFFICIENT RETRIEVAL OF DOCUMENT ACCESS DATA

BENEFIT CLAIM

This application claims the benefit under 35 U.S.C. § 119 of provisional application 62/731,100, filed Sep. 14, 2018, the entire contents of which are hereby incorporated by reference as if fully set forth herein.

FIELD OF THE DISCLOSURE

One technical field of the present disclosure is computer-implemented techniques for controlling access to electronic resources such as storage, folders, applications and documents. Another technical field is computer-implemented access control lists (ACLs) as applied to electronic documents. Another technical field is computer-implemented control of electronic documents that are classified for security purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Past approaches to managing access control lists (ACLs) for electronic documents have involved creating a unique identifier (ID) for each ACL, then associating the IDs with account identifiers or user identifiers or using security groups. For example, obtaining access to a document could require a user identifier to be within a particular security group; similarly, if a document is marked "Class A," then the user could be associated with the Class A level of access to achieve access to that particular document. To determine whether a particular user or account is allowed to access a document, in one approach, a database query causes a computer to retrieve all documents matching a particular search query that the user has provided without regard to security or access issues. The computer then determines for each document whether the user is in one of the security groups which grants the user permission to the document according to the associated ACLs. When the search returns millions of documents or "hits", but the user might be allowed access to only a few, this approach is inefficient.

Another approach is to create mappings of security groups or classifications to ACL IDs, which are typically integers, then associate permitted policies via the integer values with documents. A search query begins by identifying a subset of all ACL IDs that are associated with a user account, then includes that subset as a query term such that the subset must intersect with ACL IDs of documents in the result set. This approach is workable if the number of distinct ACL IDs is small. However, if the total number of ACL IDs is very large, then checking an intersection with the set of ACL IDs would cause performance to suffer. Further, if changes in security policies occur frequently, then many recalculations of the query parameters may be needed.

Based on the foregoing, improvements in processing security attributes of stored digital data are needed.

SUMMARY

The appended claims may serve as a summary of the invention.

DETAILED DESCRIPTION

Figure 1:
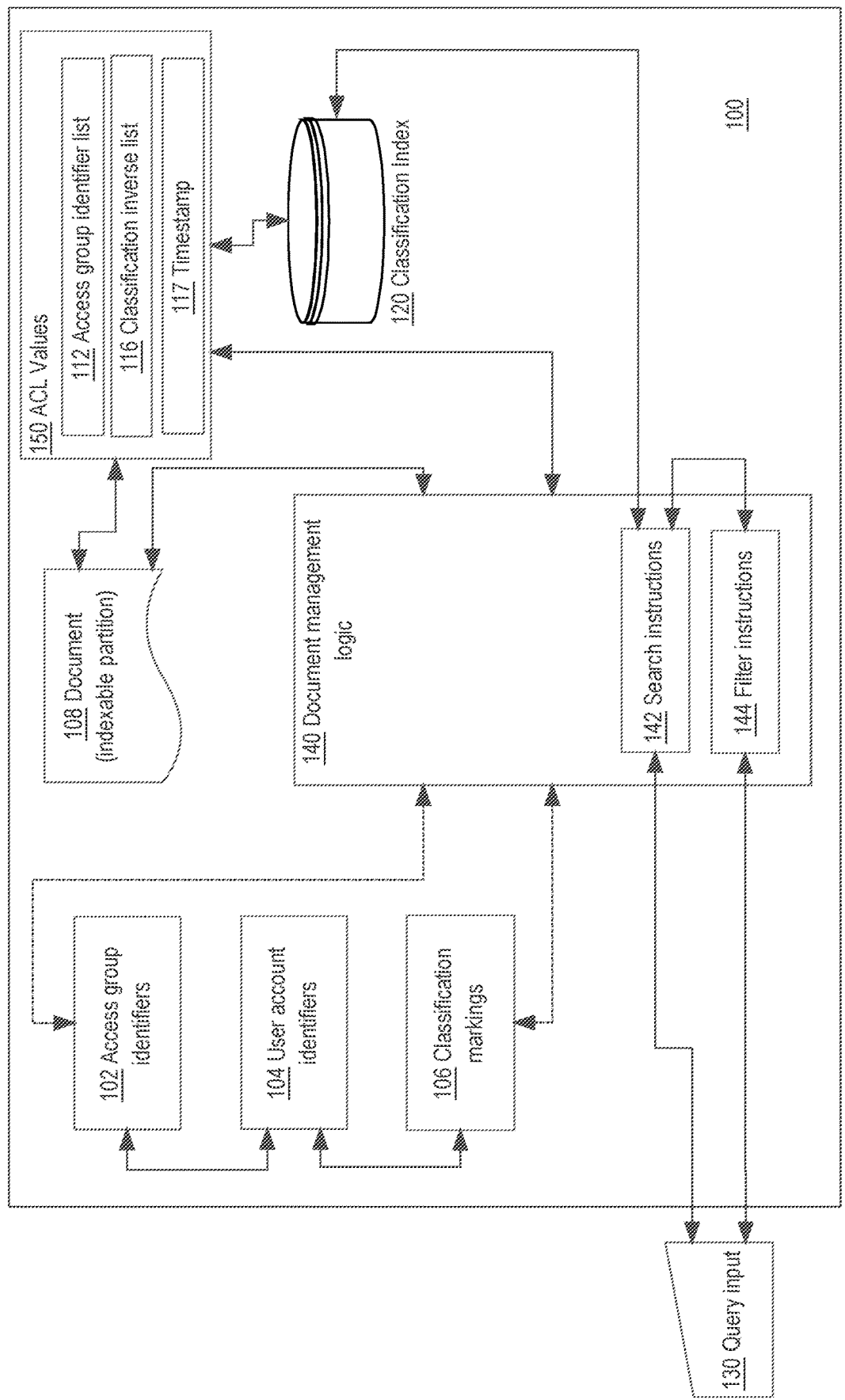
FIG. 1 illustrates an example computer system with which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In embodiments, each security policy among a plurality of security policies may comprise a set of groups and a set of classification markings. Improved security control of electronic resources is disclosed including techniques in which values of attributes of security policies are indexed directly in the form of group identifiers and classification markings, rather than using a security policy identifier that indirectly represents groups, classifications or other aspects of access controls. Search queries include the groups or classifications that are associated with a user, and only documents matching those groups or classifications are retrieved using queries that are constructed using logic that has been optimized for efficiency.

In an embodiment, rather than indexing a list of one or more security policy identifiers in association with a particular document, a computer system is programmed to represent the contents or values of security policies in indexes. For example, the group identifiers and classification markings that may be represented in a security policy are associated directly with an electronic document and indexed. A search query comprises attributes of matching documents and also lists of the group identifiers and markings of a user account, representing access privileges that have been granted to that user account. In response, query processing logic evaluates whether the groups and markings, to which a particular user has access, satisfy the security policy represented by the groups and markings of a document.

In logic to evaluate matches, lists of groups associated with a document are interpreted disjunctively, such that a user having access to any of the groups that are associated with a document will be granted access to the document. This interpretation is joined conjunctively with an interpretation of lists of classification markings, so that satisfying both interpretations is required. The lists of classification markings associated with a document are interpreted conjunctively, such that a user must have permission for all the markings of a document to access the document. Thus, when both groups and markings are associated with a document, the user must satisfy all the classification markings and one or more of the groups. In some embodiments, markings are partitioned by categories, and a user or user account must satisfy all categories. Categories can be conjunctive or disjunctive. As an example, a document may have markings M1, M2, M3, M4, where M1, M2 are in Category A which is conjunctive, and M3, M4 are in Category B which is disjunctive; in this situation, the user account must satisfy M1 and M2, as well as one of M3 or M4.

In one embodiment, a computer-implemented method comprises creating and storing a plurality of different access group identifiers each associated with one or more user account identifiers, and a plurality of different classification markings each representing a different access restriction for an electronic document, and associating each of the user account identifiers with one or more of the classification markings; indexing each particular electronic document among a plurality of different electronic documents in association with values of one or more of the access group identifiers and with an inverse list of values of the classification markings that apply to the particular electronic document in a classification index; receiving a search query that specifies one or more attributes of electronic documents; obtaining one or more first classification markings, among the plurality of classification markings, which are associated with a particular user account identifier that is associated with the search query; executing a search of the classification index based on the search query using a covering query that requires a specified minimum number of matches between the one or more first classification markings and one or more second classification markings that are associated with a particular electronic document, and adding the particular electronic document to a result set of the search only when the covering query is satisfied; providing the result set in response to the search query.

In another embodiment, a computer-implemented method comprises creating and storing a plurality of different access group identifiers each associated with one or more user account identifiers, and a plurality of different classification markings each representing a different access restriction for an electronic document, and associating each of the user account identifiers with one or more of the classification markings; indexing each particular electronic document among a plurality of different electronic documents in association with values of one or more of the access group identifiers and with an inverse list of values of the classification markings that apply to the particular electronic document in a classification index; receiving a search query that specifies one or more attributes of electronic documents; obtaining at least a first classification marking, among the plurality of classification markings, which is associated with a particular user account identifier that is associated with the search query; executing a search of the classification index based on the search query, and in response to obtaining a result set identifying electronic documents having inverse lists that do not include the first classification marking, providing the result set in response to the search query.

2. Structural and Functional Overview

FIG. 1 illustrates an example computer system with which embodiments may be implemented. In an embodiment, the elements of FIG. 1 may be hosted using a computer system 100 including any of a desktop computer, a networked server computer system and/or one or more virtual computing instances in a datacenter or cloud computing system. Each element of FIG. 1 is computer-implemented, using digital data storage, executable instructions and a computing device such as the computer system of FIG. 5.

In an embodiment, a plurality of different access group identifiers 102, user account identifiers 104 and classification markings 106 are created and stored in digital storage and maintained on an administrative basis for reference and use in connection with large numbers of user accounts, documents and index entries, as further described. The access group identifiers 102 may comprise string, alphanumeric or other symbolic identifiers of groups of user account identifiers that all have the same access privileges. Specific values of access group identifiers 102 are arbitrary; examples are "Finance_group," "dev_tools," "Joes_group" and so forth. The user account identifiers 104 comprise numeric, string, alphanumeric or other symbolic identifiers of user accounts. Specific values of user account identifiers 104 are arbitrary and could include "jdoe," "deborah204" or others.

The classification markings 106 are labels that reflect different levels of security classification that may be applied to documents. Example labels could refer to levels of secrecy or indicate that a document is "Releasable to S" where S is an organization or entity. (The preceding sentence does not so mark this patent document.) A finite list of classification markings 106 is used. In an embodiment, each marking has a category, which may be statically configured; examples of categories include a secrecy category and a releasable-to category. Example values of markings in the secrecy category may be {Confidential, Secret, Internal}. Example values of markings in the releaseable-to category may be {Releaseable-to-A, Releaseable-to-B, Releaseable-to-C}. Each category may be conjunctive or disjunctive, as specified in metadata in a category definition.

In an embodiment, electronic document 108 is associated with a set of ACL values 150. References to "document," in this disclosure, refer broadly to any kind of dataset or partition that can be indexed and manipulated using an application program. In one embodiment, a document is equivalent to a property of a programmatic object and thus may comprise less than all of a complete object having many properties or attributes. For example, a programmatic object may represent a person having a plurality of properties each of which may be secured differently, and each such property may be termed a partition or document. In some embodiments, documents may be any of word processing documents, spreadsheets, e-mail messages, presentations or slides, program code, sets of financial data or other datasets, as well as properties of any of the preceding. In an embodiment, a data storage device, repository or system may hold any number of electronic documents 108 and a single document is shown in FIG. 1 only to illustrate a clear example.

In an embodiment, each set of ACL values 150 comprises a document-specific access group identifier list 112, a classification inverse list 116 that is indexed in a classification index 120, and a timestamp 117. The access group identifier list 112 for a document 108 comprises a stored set of group identifiers corresponding to groups that are authorized to access the document in a particular manner. Examples of group identifiers have been given above.

The classification inverse list 116 for a document 108 comprises a list of the inverse of the classification markings that actually apply to the document. For example, if classification markings 106 comprises labels {Confidential, Secret, Internal} and document 108 is classified only as "Secret", then the inverse list 116 for that document comprises {Confidential, Internal}. Some embodiments do not require an inverse list 116 and may store and index classification markings, categories and/or groups directly with documents without the use of an inverse approach.

In an embodiment, computer system 100 executes document management logic 140, which comprises one or more stored sequences of program instructions that are programmed to carry out the functions that are described in other sections of this disclosure. In general, document management logic 140 is programmed to receive query input 130 from another computer, process, terminal or system; to use search instructions 142 to formulate one or more search queries to classification index 120; to evaluate classification inverse list 116 of each document 108 that forms part of one or more result sets that are created after processing the search queries; and to use filter instructions 144 to filter the result sets for delivery to the other computer, process, terminal or system in response to the query input 130. Further details of processing functions, data flows and other aspects of these operations are discussed in other sections herein.

Certain embodiments may be implemented using the Elasticsearch open source search engine on the Lucene open source data repository, and certain terminology herein is specific to those systems. However, other embodiments may use other search and storage systems as foundation and implement functionally equivalent logic or processes using additional program instructions.

Figure 4:
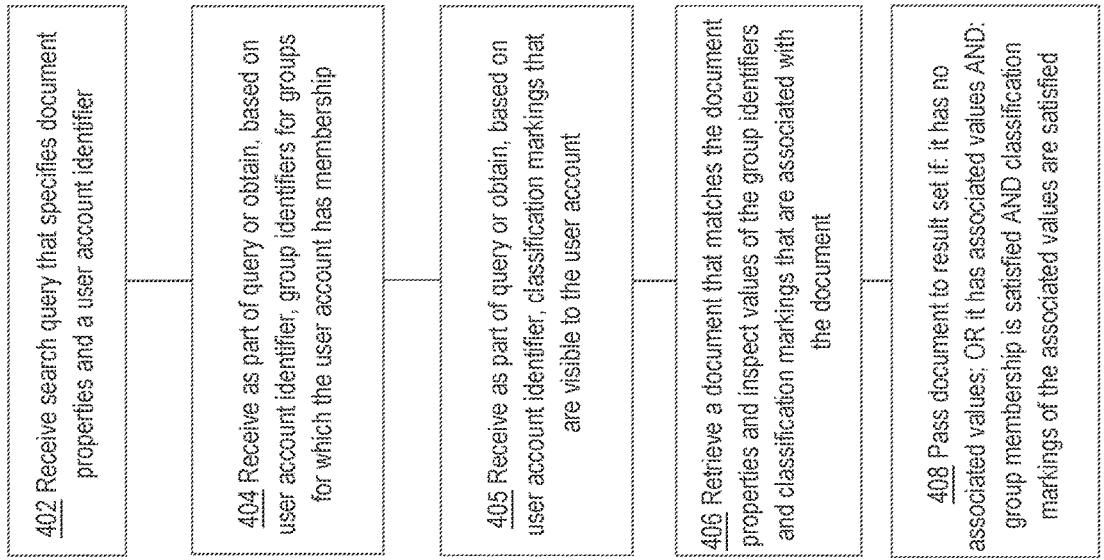
FIG. 4 illustrates an example processing flow that may be used to process search queries in embodiments.

FIG. 4 illustrates an example processing flow that may be used to process search queries in embodiments.

At step 402, a search query is received that specifies document properties and a user account identifier. Step 402 may execute in a variety of contexts, in response to receiving a programmatic call that passes a query that is effectively fully embedded into or integrated with a federated set of applications, and/or as part of an interactive online search system. Regardless of the execution context, step 402 involves receiving a query that identifies a user account and specifies attributes or properties of documents that would match the query. The other steps of the flow of FIG. 4 are arranged to automatically refine or modify the query to constrain the query to security and classification attributes that will yield documents in a result set that the user account is permitted to access or view.

At step 404, the process receives as part of the query of step 402, or obtains based on the user account identifier, a list of group identifiers for groups for which the user account has membership. Similarly, at step 405, the process receives or obtains a list of classification markings that are visible to the user account. These lists may be obtained directly from the query of step 402 or, based on the user account identifier, retrieved via queries to a separate database or repository of credentials that are associated with user accounts.

At step 406, the process retrieves a document that matches the document properties and upon retrieval inspects values of the group identifiers and classification markings that are associated with the document. This is a candidate document for which further filtering is necessary to determine if the user account is privileged to access it.

Therefore, at step 408, a filter step is executed in which the document is passed to a result set if: there are no group identifiers or classification markings associated with it, such that ACL values 150 is null, for example; or if a set of ACL values is present, and both group membership are satisfied, and classification of the associated values is satisfied. In some embodiments, all classification markings are separately indexed. In part, step 408 may comprise computing an intersection of the categories and markings that a user account has, as compared to those of the document. If the intersection is not null, then the document passes the filter, otherwise the document does not match. This approach is effective if every category is interpreted disjunctively, but for conjunctive categories, computing an intersection is inadequate and added logic is implemented.

In one embodiment, when a category is conjunctive, a programmatic definition of the classification marking category further comprises lists of category groups as positive lists and negative lists as shown in the code excerpt of TABLE 1.

TABLE 1

CATEGORY GROUP DEFINITIONS

```
{
   "properties":
      ElasticsearchConstants.POSITIVE_PREFIX: {
         "type":"object",
         "dynamic":true
      }
      ElasticsearchConstants. NEGATIVE_PREFIX: {
         "type":"object",
         "dynamic":true
      }
   }
}
``` where each entry in POSITIVE PREFIX and NEGATIVE PREFIX could be in the form: 3:[1,7,10,15] where "3" is the identifier of the category and the array specifies the group identifiers that must match (for positive) or must not match (for negative).

The specific values of categories of markings, or groups, are not critical as the logic disclosed herein depends more on whether groups or markings are interpreted disjunctively or conjunctively.

In an embodiment, filter instructions 144 may be programmed to execute the foregoing logical rules as:

1. Group membership is satisfied. The group labels that are associated with the document are obtained from the document index, and an intersection of those labels is calculated with the list of the group labels associated with the user account. If the intersection is not null, then the document passes the filter; otherwise there is no match.

2. For each conjunctive classification marking category that is present, a user account satisfying all the markings of a document in that category is required to grant the user account access to the document. In one implementation, filter instructions 144 are programmed to generate a query based on the following. First, markings for a conjunctive category in the document's ACL value cannot be in the user account's negative marking set. These are markings that the user account does not have, and therefore, if markings for a conjunctive category in the document's ACL value are in the negative set, they fail to satisfy that category. Second, the document may not have any marking that is unknown. An unknown marking has a timestamp that is greater than the maximum marking timestamp on the user account's ACL value filter. Therefore, if a user account adds a marking to a conjunctive category and indexes a document with that ACL value, then the ACL value filter is out-of-date; therefore, the instructions are programmed to filter out those documents.

3. For every disjunctive classification marking category that is present, a user account satisfying at least one of the markings of a document in that category is required to grant the user account access to the document. In one implementation, filter instructions 144 are programmed to generate a query based on the following. First, either the document has no markings for this category in its ACL value, or some marking in the document's ACL value is in the user account's positive marking set.

Furthermore, in some embodiments, to address conjunctive categories of markings, either of two search strategies may be used. In a first search strategy, a search query is inverted to negate the set of markings on the ACL value filter for the user account. For example, assume that A is the set of conjunctive markings securing the document, B is the set of markings to which the user account has access, and C is the set of markings to which the user account does not have access. The query is formed such that nothing in A is in C and nothing in A is in neither B or C. The latter part of the query can rely on the maximum marking timestamp. With this approach, a query may provide the markings that are associated with a user, and in response, the system may compute an intersection of the search query and the document markings, and if there is a match, access is denied. Thus, if a particular user account is associated with "Secret" and an intersection computation determines that document D has a match, then access is denied because the actual document marking is NOT "Secret".

Figure 2:
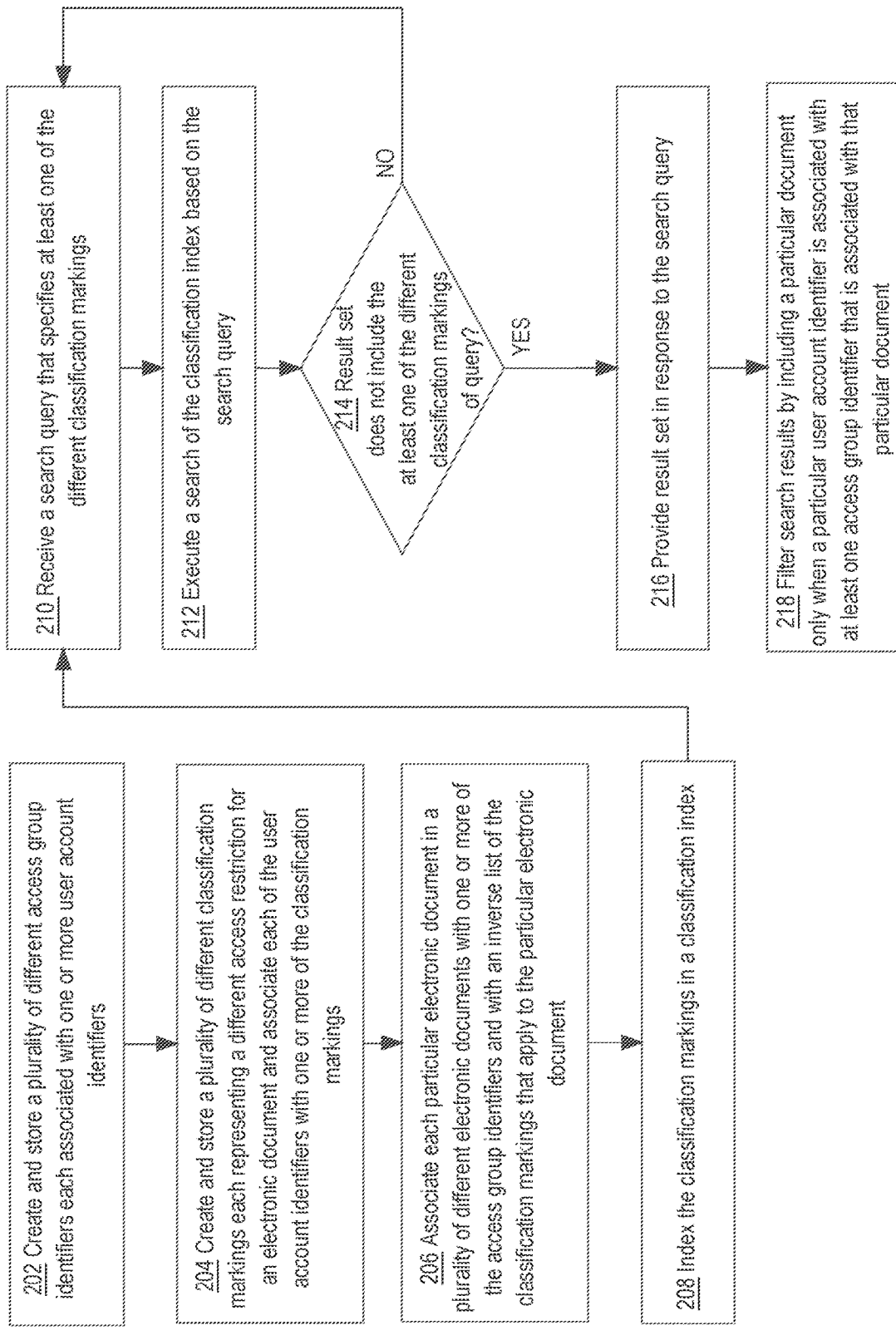
FIG. 2 illustrates a first example of a computer-implemented method of associating access group identifiers and classification markings with documents, and searching the documents based on the markings.

FIG. 2 illustrates a first example of a computer-implemented method of associating access group identifiers and classification markings with documents, and searching the documents based on the markings according to a first search strategy. FIG. 2 may be implemented, for example, in program instructions by a combination of search instructions 142 and filter instructions 144.

In an embodiment, in a computer-implemented method, step 202 comprises creating and storing a plurality of different access group identifiers each associated with one or more user account identifiers. Step 202 can comprise creating and storing statically defined access group identifiers 102 of FIG. 1.

At step 204, the process creates and stores a plurality of different classification markings each representing a different access restriction for an electronic document. Each of the user account identifiers is associated with one or more of the classification markings. These steps may be executed asynchronously at any time. As an example, step 204 can comprise creating and storing static definitions of user account identifiers 104 and classification markings 106 as seen in FIG. 1.

At step 206, the process associates each particular electronic document in a plurality of different electronic documents with one or more of the access group identifiers and with an inverse list of the classification markings that apply to the particular electronic document. At step 208, the process indexes or causes indexing the classification markings in a classification index. Steps 206, 206 may comprise both indexing document 108 of FIG. 1 and associating it with a set of ACL values 150 comprising an access group identifier list 112, classification inverse list 116 and optionally timestamp 117, which are also indexed.

At step 210, the process receives a search query that specifies at least one of the different classification markings. Step 210 may comprise receiving a programmatic call, method or function invocation from another process, program or system and/or receiving a query via user input in a user interface as part of an interactive search-response system.

At step 212, the process executes a search of the classification index based on the search query. In some embodiments, step 212 causes creating and storing a result set of identifiers of documents that match the search query based on document attributes.

At step 214, the process tests whether a result set does not include the at least one of the different classification markings specified in the query. Step 214 may comprise computing an intersection and testing for a non-null result of the intersection computation, as previously described. If step 214 yields TRUE or YES, then at step 216, the result set is provided in response to the search query. Otherwise, results are not provided, and the process may return control to step 210 to await another query, or return control to a calling process, if applicable.

At step 218, the process filters the search results by including a particular document only when a particular user account identifier is associated with at least one access group identifier that is associated with that particular document. Step 218 represents checking whether the group identifiers associated with a user account match at least one group identifier of the document; an intersection calculation may be used to yield the result. Step 218 may be executed after step 212 in some embodiments, rather than after steps 214, 216.

In a second search strategy, markings are indexed directly, and a covering query is used in which N matches are required where N markings are indexed for a particular document and N varies per document. The use of covering queries permits implementing search logic with intersection computations that result in a certain number of required matches.

Figure 3:
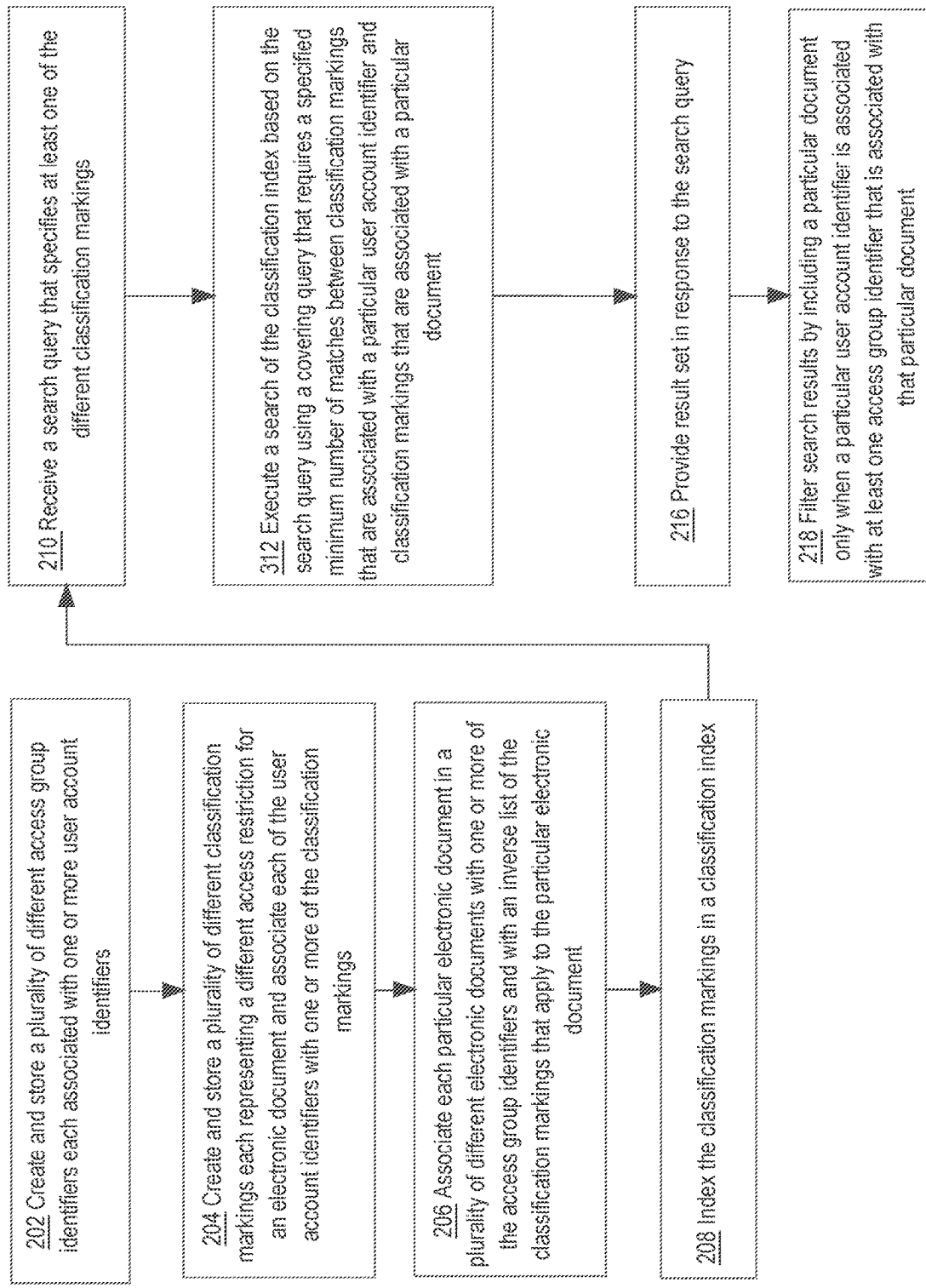
FIG. 3 illustrates a second example of a computer-implemented method of associating access group identifiers and classification markings with documents, and searching the documents based on the markings.

FIG. 3 illustrates a second example of a computer-implemented method of associating access group identifiers and classification markings with documents, and searching the documents based on the markings.

In the example of FIG. 3, steps 202, 204, 206, 208, 210 are the same as in FIG. 2 and include creating and storing a plurality of different access group identifiers each associated with one or more user account identifiers; creating and storing a plurality of different classification markings each representing a different access restriction for an electronic document, and associating each of the user account identifiers with one or more of the classification markings; associating each particular electronic document in a plurality of different electronic documents with a list of the classification markings that apply to the particular electronic document and indexing the classification markings in a classification index; and receiving a search query that specifies at least one of the different classification markings.

At step 312, the method is programmed for executing a search of the classification index based on the search query using a covering query. The covering query expresses a requirement for a specified minimum number of matches between classification markings that are associated with a particular user account identifier and classification markings that are associated with a particular document, in the manner that has been described in previous paragraphs. Thus, if N markings have been indexed for a document, then a covering query will return the document in a result set if the user account is associated with N markings also—that is, when all of N markings match. In embodiments that use Elasticsearch, covering queries are implemented as a "term set query." Different covering queries may dynamically specify to use the number of markings that have been indexed for any particular document otherwise found in the search, which will be N for that document, as the matching constraint for a particular covering query. Thus, the covering query approach may comprise executing a plurality of separate queries with a requirement to match a specified minimum number of those separate queries, in which the number may dynamically vary and is specified by a referenced field value.

Thus, as the query executes, different documents under consideration will cause evaluation of different numbers of indexed values for the different documents. Consequently, the search logic comprises a computation both of an intersection of group labels based on a plurality of terms queries, and an intersection of classification markings, the latter using a covering query. The result effectively comprises execution of an intersection of a covering query over term queries and a plurality of terms queries, in implementations using Elasticsearch and Lucene.

In some cases, elements of these searches may be combined into one combination query for purposes of execution efficiency. For example, if there are multiple categories of classification markings that each operate conjunctively, the categories can be combined in a single conjunctive query. Thus, a user with M markings and N groups, the M markings will contribute M term queries, one for each marking, and the N groups contribute one (1) terms query. The result of this simplification approach is a covering query over a plurality of terms queries and a plurality of term queries.

The result of step 312 is a digitally stored result set having zero or more result items. At step 216, the result set is provided in response to the search query.

At step 218, as in FIG. 2, the process is programmed for filtering the search results by including a particular document only when a particular user account identifier is associated with at least one access group identifier that is associated with that particular document.

In some embodiments, marking timestamp values may be associated with markings and the timestamps are increased whenever a new marking is added to a document; furthermore, current timestamps may be indexed at the time that a document is indexed. Consequently, search queries can determine when the markings of a document are outdated based on comparing a logical timestamp that is independent of system clock time to the timestamp.

Embodiments offer a number of benefits over past approaches. For example, in the present approaches, the size of a query is proportional to the number of groups and markings that exist rather than the number of policy identifiers that exist; in many systems the difference will be several orders of magnitude smaller, thereby substantially reducing use of CPU cycles, network messages, volatile memory storage and non-volatile storage. Where the number of security policies is in the millions, the number of groups is in the thousands and the number of markings is in the hundreds or less, the present approaches offer significantly more efficient processing and therefore faster return of search results.

In some embodiments, rather than indexing and/or using values for groups to map to group names, and using markings to map to marking titles, group identifiers and marking group identifiers may be indexed and used.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
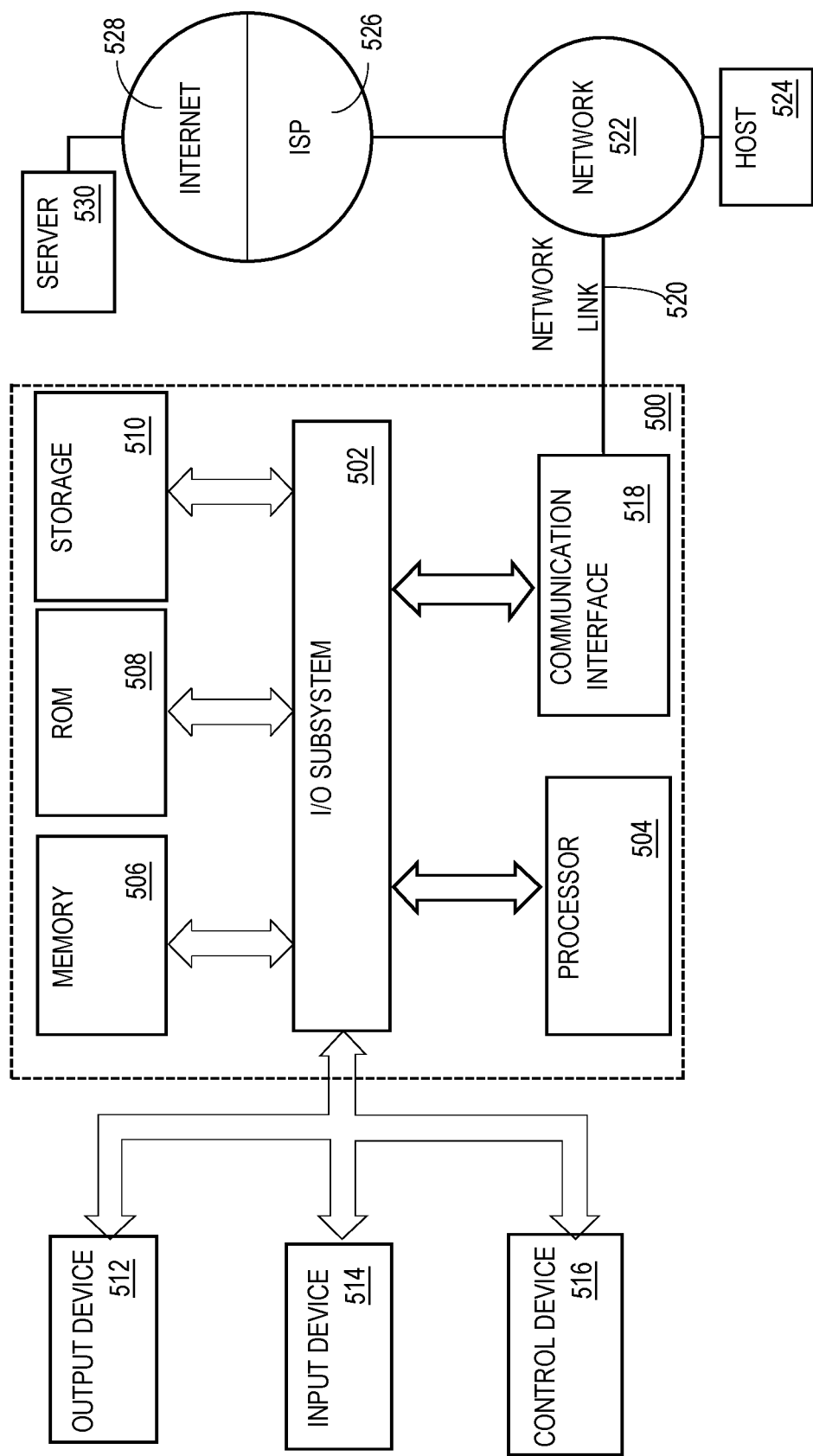
FIG. 5 illustrates an example computer system with which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   creating and storing a plurality of different access group identifiers each associated with one or more user account identifiers, and a plurality of different classification markings each representing a different level of security classification of an electronic document;
   associating each of the user account identifiers with at least one of the plurality of different classification markings;
   indexing and storing in a classification index, for each particular electronic document among a plurality of different electronic documents, one or more of the plurality of access group identifiers;
   indexing and storing in the classification index, for each particular electronic document among the plurality of different electronic documents, an inverse list comprising classification markings that do not apply to the particular electronic document from the plurality of different classification markings;
   receiving, after the indexing and storing, a search query that specifies one or more classification markings of electronic documents;
   obtaining at least a first classification marking, among the plurality of different classification markings, which is associated with a particular user account identifier that is associated with the search query;
   executing, based on the search query, a search of the classification index available prior to receiving the search query to obtain a result set of electronic documents, including a specific electronic document having an inverse list that does not include the one or more classification markings and that is associated with no access group identifiers,
   wherein executing the search comprises calculating an intersection of the first classification marking and the inverse lists of the plurality of different electronic documents and excluding electronic documents for which there is a match between the first classification marking and a corresponding inverse list from the result set of electronic documents; and
   providing the result set of electronic documents in response to the search query,
   wherein the computer-implemented method is performed using one or more processors.

2. The computer-implemented method of claim 1, the result set of electronic documents including a certain electronic document having an inverse list that does not include more than a specified number of the one or more classification markings.

3. The computer-implemented method of claim 1 wherein each electronic document corresponds to a property of a programmatic object having a plurality of properties.

4. The computer-implemented method of claim 1, a classification marking of the plurality of different classification markings being related to secrecy or releasability.

5. The computer-implemented method of claim 1, further comprising filtering the result set of electronic documents by including a certain electronic document only when the particular electronic document does not have a classification marking that has a timestamp greater than a maximum marking timestamp associated with the particular user account identifier.

6. The computer-implemented method of claim 1, further comprising in response to obtaining the result set of electronic documents, filtering the result set of electronic documents by including a certain electronic document only when the particular user account identifier is associated with at least one access group identifier that is associated with that certain electronic document.

7. One or more non-transitory computer-readable storage media storing one or more sequences of instructions which, when executed using one or more processors, cause the one or more processors to execute:
   creating and storing a plurality of different access group identifiers each associated with one or more user account identifiers, and a plurality of different classification markings each representing a different level of security classification of an electronic document;
   associating each of the user account identifiers with at least one of the plurality of different classification markings;
   indexing and storing in a classification index, for each particular electronic document among a plurality of different electronic documents, one or more of the plurality of access group identifiers;
   indexing and storing in the classification index, for each particular electronic document among the plurality of different electronic documents, an inverse list comprising classification markings that do not apply to the particular electronic document from the plurality of different classification markings;
   receiving, after the indexing and storing, a search query that specifies one or more classification markings of electronic documents;
   obtaining at least a first classification marking, among the plurality of different classification markings, which is associated with a particular user account identifier that is associated with the search query; executing, based on the search query, a search of the classification index available prior to receiving the search query to obtain a result set of electronic documents, including a specific electronic document having an inverse list that does not include the one or more classification markings and that is associated with no access group identifiers,
   wherein executing the search comprises calculating an intersection of the first classification marking and the inverse lists of the plurality of different electronic documents and excluding electronic documents for which there is a match between the first classification marking and a corresponding inverse list from the result set of electronic documents; and providing the result set of electronic documents in response to the search query.

8. The one or more non-transitory computer-readable storage media of claim 7, the result set of electronic documents including a certain electronic document having an inverse list that does not include more than a specified number of the one or more classification markings.

9. The one or more non-transitory computer-readable storage media of claim 8 wherein each electronic document corresponds to a property of a programmatic object having a plurality of properties.

10. The one or more non-transitory computer-readable storage media of claim 7, a classification marking of the plurality of different classification markings being related to secrecy or releasability.

11. The one or more non-transitory computer-readable storage media of claim 7,
the one or more sequences of instructions further causing the one or more processors to execute filtering the result set of electronic documents by including a certain electronic document only when the certain electronic document does not have a classification marking that has a timestamp greater than a maximum marking timestamp associated with the particular user account identifier.

12. The one or more non-transitory computer-readable storage media of claim 7,
the one or more sequences of instructions further causing the one or more processors to execute, in response to obtaining the result set of electronic documents, filtering the result set of electronic documents by including a certain electronic document only when the particular user account identifier is associated with at least one access group identifier that is associated with that certain electronic document.

\* \* \* \* \*